United States Patent [19]

Sargent

[11] Patent Number: 4,590,815

[45] Date of Patent: * May 27, 1986

[54] MULTIPLE CONE TYPE VARIABLE POWER TRANSMISSION MECHANISM

[76] Inventor: Frank R. Sargent, 361 Talbott Ave., Laurel, Md. 20707

[*] Notice: The portion of the term of this patent subsequent to Jul. 17, 2001 has been disclaimed.

[21] Appl. No.: 658,295

[22] Filed: Oct. 5, 1984

[51] Int. Cl.[4] .................... F16H 15/16; F16H 13/00
[52] U.S. Cl. ......................................... 74/191; 74/208
[58] Field of Search .................... 74/191, 193, 208

[56] References Cited

U.S. PATENT DOCUMENTS

| | | | |
|---|---|---|---|
| 414,191 | 11/1889 | Conant | 74/190.5 |
| 722,245 | 3/1903 | Nutting | 74/191 |
| 1,178,834 | 4/1916 | Beland | 74/191 |
| 1,379,511 | 5/1921 | Ballard | 74/191 |
| 1,431,649 | 10/1922 | Gillette | 74/191 |
| 1,443,991 | 2/1923 | Hayden | 74/191 |
| 1,459,979 | 6/1923 | Kohn | 74/191 |
| 2,559,230 | 7/1951 | Schottler | 74/191 |
| 2,650,414 | 9/1953 | Kreamer | 74/191 |
| 2,715,164 | 8/1955 | Hufnagel | 74/191 |
| 2,749,491 | 6/1956 | Stinger | 74/191 |
| 2,776,591 | 1/1957 | McBride | 74/191 |
| 3,222,944 | 12/1965 | Harned | 74/208 |
| 3,280,646 | 10/1966 | LeMieux | 74/200 |
| 4,192,200 | 3/1980 | McCoin | 74/191 |
| 4,192,201 | 3/1980 | McCoin | 74/191 |
| 4,322,798 | 3/1982 | McCoin | 74/191 |
| 4,393,964 | 7/1983 | Kemper | 74/191 |
| 4,459,868 | 7/1984 | Sargent | 74/208 |

FOREIGN PATENT DOCUMENTS

| | | | |
|---|---|---|---|
| 7930227 | 6/1979 | European Pat. Off. | 74/280 |
| 0003887 | 6/1979 | European Pat. Off. | 74/191 |
| 878083 | 1/1943 | France | 74/191 |

*Primary Examiner*—Lawrence J. Staab
*Assistant Examiner*—Michael D. Bednarek

[57] ABSTRACT

A computer controlled variable transmission in which power is transferred from an input shaft through gearing to idler comes mounted in sequence by gearing means then to an output shaft. The transmission ratio is a function of the ratio of output power required to the input torque as determined by a torque sensing means. Multiple input and output drive wheels, mounted on jackshafts placed equidistant around the cones, provide stability and eliminate slippage.

3 Claims, 2 Drawing Figures

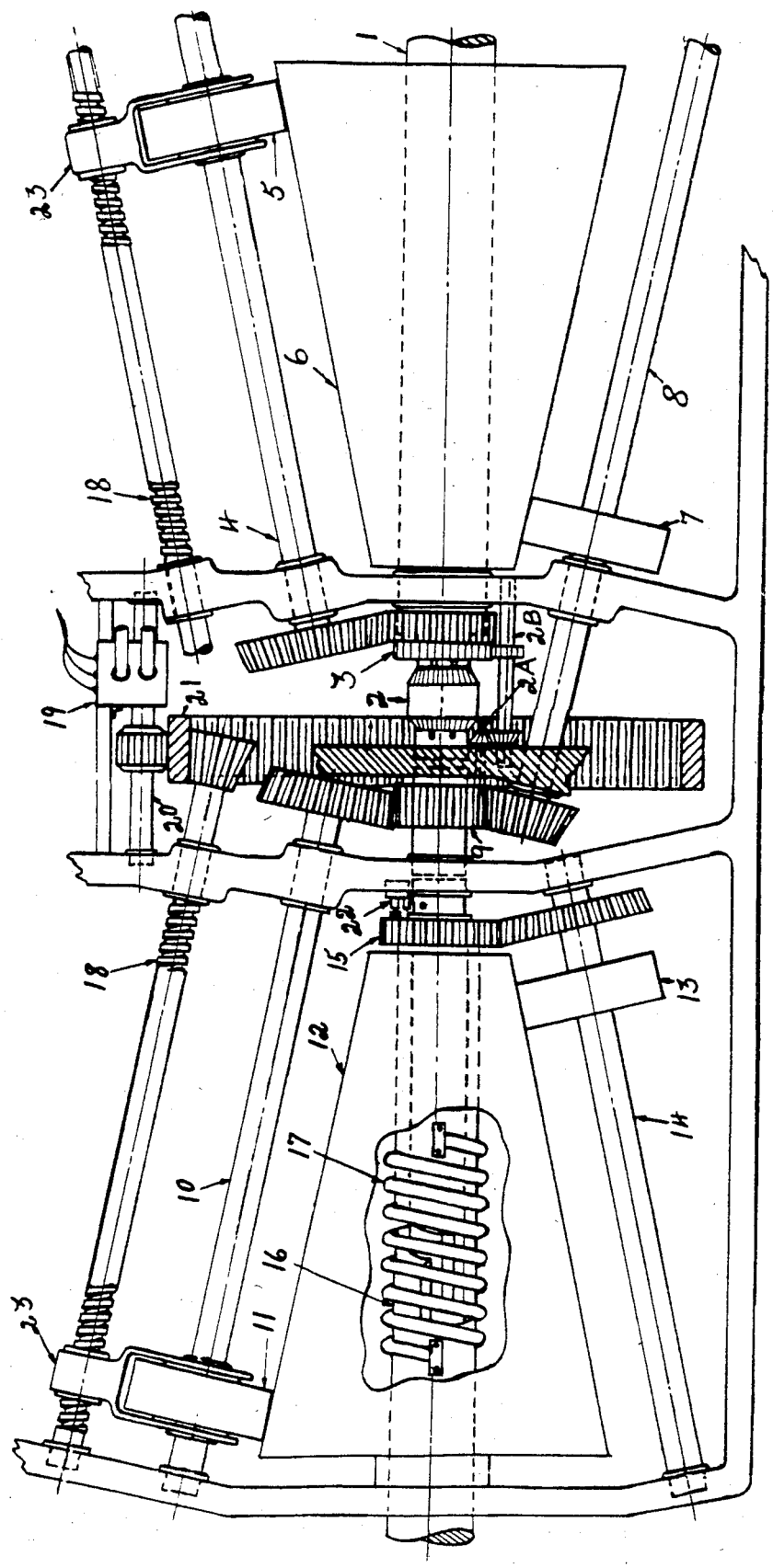

MULTIPLE CONE TYPE VARIABLE POWER TRANSMISSION MECHANISM

CROSS REFERENCE TO RELATED APPLICATIONS

This invention relates to and is improvements thereon to U.S. Pat. No. 4,459,868, issued to this inventor on July 17, 1984.

BACKGROUND OF THE INVENTION

The need to converse fuel in motor vehicles and other applications is attenuated by the ever present specter of another world fuel oil crisis. Government decrees have required the automobile industry to scale down the size of automobiles as one of the best means of saving fuel and the industry has made every effort to create ever more efficient power plants for their vehicles. One aspect of automobile construction, however, has not heretofore been successfully addressed. That aspect is the inherent inefficiency of the vehicle drive train comprising the transmission and axle assembly.

Transmissions now in use in automobiles provide for gear ratios of from approximately 4.5:1 to 1:1, with slightly higher ratio for high speed by the addition of an 'overdrive' gear. Present technology does not allow for the much needed expansion of power ratios within the present configuration of the transmission. It is therefore necessary to use a much more powerful power plant for efficient operation at low speed/high power modes than is necessary to efficiently propel the vehicle at cruising speeds.

The problem is two fold. With power ratios of 8:1 or 10:1 the size of the power plant could be reduced by as much as 50%, with even greater efficiency and corresponding fuel conservation. At the other end of the spectrum; a comfortable 'high' gear ratio can be achieved at only 25 to 30 mph, yet, when speeds of 50 or 60 mph are reached, where minimal power is needed to propel the vehicle, it is impossible to slow down the motor without slowing down the vehicle. The transmission, in it's present configuration, locks the drive train to the motor and requires the motor to operate at it's greatest power potential, with corresponding use of fuel, when minimum power is actually needed.

The solution to both cited problems has been successfully addressed by this inventor in his previously cited U.S. Pat. No. 4,459,868 and this invention enhances and expands that mechanism with novel and unique improvements.

TECHNICAL FIELD

Split power train transmissions utilizing a cone with smaller drive wheels is not new, however, the inherent problems of wear and slippage encountered by friction gear surfaces has limited the use of the art to peripheral functions in infinitely variable transmissions, utilizing sun and multiple planetary gears, such as is contemplated by McCoin (1980–82) U.S. Pat. Nos. 4,192,200–201 and 4,322,798, as well as Harned (1965) U.S. Pat. No. 3,222,944. The latest attempt to use the cone as the central component of a power transmission mechanism, prior to this inventor in Sargent (1984) U.S. Pat. No. 4,459,868, was by Hayden (1923) U.S. Pat. No. 1,443,991. Mr. Hayden did not have access to present day technological advancements in computer science, fibers and other developments and his basic concept has laid dormant until resurrected by this inventor.

RELATED ART AND FIELD OF SEARCH

Patent references and related art cited in this application is as follows:
International Cl ... F16H 15/16; F16H 13/00
U.S. Cl ... 74/191; 74/208
Field of Search ... 74/193, 191, 208
CONANT (1889) U.S. Pat. No. 414,191
BALLARD (1921) U.S. Pat. No. 1,379,511
HAYDEN (1923) U.S. Pat. No. 1,443,991
HUFNAGLE (1955) U.S. Pat. No. 2,715,164
STINGER (1956) U.S. Pat. No. 2,749,491
McBride (1957) U.S. Pat. No. 2,776,591
HARNED (1965) U.S. Pat. No. 3,222,944
LeMIEUX (1966) U.S. Pat. No. 3,280,646
McCOIN (1980) U.S. Pat. Nos. 4,192,200–201
McCOIN (1982) U.S. Pat. No. 4,322,798
EUROPEAN PATENT OFFICE (1979) No. 7930227

SUMMARY OF THE INVENTION

The inherent problems of present technology in motor vehicle transmission systems is due almost entirely to the limitations imposed by it's mechanical configuration, as set forth in BACKGROUND OF THE INVENTION above, and, while this inventor's prior patent achieved a breakthrough in enabling the operator of a motor vehicle to utilize varying power ratios without the necessity of getting 'in and out of' different mechanical 'gear ratios' by use of a cone and drive wheels, the fundamental problems of space limitations and constant integrity of the new concept were not addressed to the degree necessary for reliable performance.

This invention contemplates the use of multiple cones so arranged that the attendant drive wheel shafts converge in a centrally located gear box in a unique manner to achieve the maximum power ratios within minimum overall size limitations. The invention provides for the drive wheels to be moved along the splined shaft by means of worm gears parallel to the shafts and synchronized by ring gear means to maintain absolute matching ratios, in perfect sequence, and the movement in tandem of each set of input and output drive wheels. The mechanism is thereby rendered 'slip-proof', thus eliminating slippage between the friction meshed members. The described configuration also allows for a wide spectrum of power ratios within a minimum overall space.

Another aspect of the invention recognizes that the toothed gears of the centrally located gear box will require a lubricant of different density and weight than the friction geared members of the mechanism, therefore, the housing of the entire system is separated into sections that may be lubricated by different means.

DESCRIPTION OF THE DRAWINGS

FIG. 1 illustrates the transmission of the present invention.

FIG. 2 illustrates a detailed view of the ring gear mechanism.

DESCRIPTION OF THE PREFERRED EMBODIMENTS

By reference to the drawings; there are two Cones(6 and 12) with multiple Input Drive Wheels(5 and 11) and multiple Output Drive Wheels(7 and 13) mounted alternately around each cone by means of Jack Shafts(4-8-

10-13). The cones are rotatably mounted around Input Drive Shaft(1) and Output Drive Shaft(16).

Sequential operation of the components is as follows:

Power is introduced to the system by means of prime mover engaged through torque converter to Input Drive Shaft(1). Slidable gear(2) splined on shaft(1) is moved by operator to engage clutch gear(3), (or Idle Gear and Shaft(2-A and 2-B for reverse), which is drivingly connected to Jack Shafts(4). Input Drive Wheels(5) are slidably mounted to turn with said jack shafts while engaged by friction means to turn First Cone(6), which by similar means is drivingly engaged to Output Drive Wheels(7). Output Drive Wheels(7) are drivingly connected to Idle Gear(9) and, in turn, to Input Drive Shafts(10) and Input Drive Wheels(11) friction geared to Second Cone(12).

The power train continues through Second Cone(12) by friction gear means to Output Drive Wheels(13), Jack Shafts(14) and Sleeve Gear(15), through Helical Spring(17) and Output Drive Shaft(16).

Functional operation of the transmission is as follows:

Sleeve Gear(15) is designed to rotate around Output Drive Shaft(16) for about ⅓ rotation to engage Output Shaft directly, and this will occur at initial engagement of transmission to propel vehicle, however, when sufficient speed is reached and maximum power is no longer needed to propel the vehicle the Helical Spring(17), which is of a predetermined strength and mounted in a manner to oppose the rotation of the sleeve Gear(15), will cause the sleeve gear to 'back off' and the output torque used to move the vehicle will actually travel from the sleeve gear, to spring, to drive shaft. Torque actually needed at any stage of operation will determine the position of the sleeve gear relative to the position of the drive shaft.

Sensor devise(22) constantly monitors the relative positions of the sleeve gear and the drive shaft, relaying this information to a computer unit. The computer, in it's programmed function, will analyze the information and activate movement of Ring Gear(21), by means of Hydraulic Valve Mechanism(19) and Control Gear(20) drivingly connected to ring gear, to sequentially move, in tandem, all input and output drive wheels to their positions along the plane of the cones to achieve the most efficient power ratio commensurate with the needs of the operator.

The operation of the transmission is totally automatic and the computer will position the drive wheels on the cones at optimum ratios for fuel conservation at all times. The operator may override the automatic controls for passing or other temporary high power needs, however, when the demand for additional power has been satisfied the power ratio will be automatically returned to optimum conditions. The unique advanced technology of the system is thus demonstrated.

I claim:

1. A computer controlled, constant meshed and integrated continuously variable power transmission system comprising:
   (a) an input shaft having forward and reverse gears selectively coupled thereto by a clutch,
   (b) an output shaft coaxial with the input shaft,
   (c) idler cones rotatably mounted on input and output shafts,
   (d) a plurality of pairs of jackshafts equally spaced about the input and output shafts; each pair comprising a drive jackshaft and a driven jackshaft diametrically opposed relative to input jackshaft;
      (i) each drive jackshaft having a first gear means for cooperating with said forward and reverse gears such that when the forward gear is coupled to the input shaft the drive jackshafts rotate in a first direction and when said reverse gear is coupled to the input shaft the drive jackshafts rotate in a second direction,
      (ii) each driven jackshaft of the first cone connected to the input jackshaft of the second cone by a second gear means,
      (iii) each jackshaft having a wheel nonrotatably and slidably mounted thereon in constant frictional contact with the idler cones, and
   (e) actuator means for controlling in tandem the position of the wheels of each jackshaft pair along their associated jackshafts;
      (i) a ring gear, turned by a hydraulic driven control gear, drivingly connected to a worm gear splined through the yoke(23) of each input and output drive wheel in a manner to move said drive wheels in tandem to any predetermined position on the cones,
   (f) torque responsive control means coupled to said output shaft for sensing the power needs of the output shaft relative to the torque of the input shaft and for controlling said actuator means, whereby positions of the wheels along the jack shafts are varried, thus the gear ratio of the transmission is a function of the sensed torque ratio.

2. The transmission of claim 1 wherein the operation is automatically controlled by computer means;
   (i) with correlation of fuel consumption, speed of vehicle and power needs to adjust ratio of gears,
   (ii) digital readout components in dashboard of vehicle to transmit all relevant information to operator.

3. The transmission of claim 1 wherein the case or housing of the entire system is divided into isolated sections for the purpose of using different lubrication means for various sections of the system.

* * * * *